Jan. 14, 1930.　　　A. J. BASTIAN　　　1,743,095
GEAR WHEEL
Filed March 29, 1924
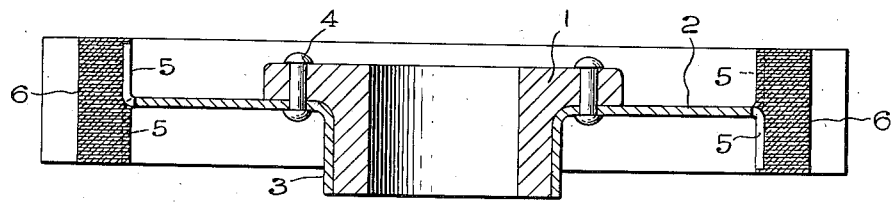
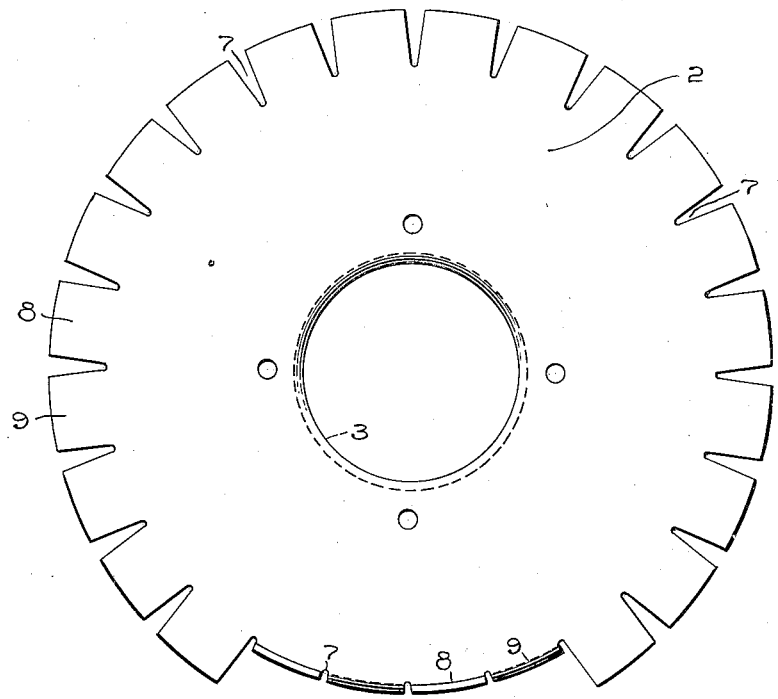
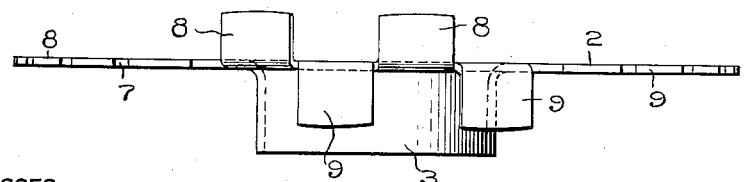
WITNESSES:
R. S. Harrison,
W. C. Wheeler.
INVENTOR
Arthur J. Bastian
BY
Wesley G. Carr
ATTORNEY Patented Jan. 14, 1930

1,743,095

UNITED STATES PATENT OFFICE

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA

GEAR WHEEL

Application filed March 29, 1924. Serial No. 702,780.

My invention refers to molded articles and particularly to molded gears and a method of constructing gear wheels having metal centers and working surfaces of molded material.

For the purpose of obtaining strength and accuracy of alignment in a gear wheel which has a working surface of molded fibrous material and a condensation product, it is desirable to provide a metal web or center. The metal provides a substantial base upon which to mold the working surface and a suitable material on which to form anchoring means for the molded material.

A cast metal center is particularly substantial and is also desirable in that it provides a suitable structure in which to mount a suitable hub or bushing. In some instances, however, it is desirable to combine the advantages of the cast metal center with a light weight structure, and my invention is directed thereto.

One object of my invention is, therefore, to provide a gear blank having a metal center which shall possess strength and resiliency and shall be light in weight.

Another object of my invention is to provide a metal center for a gear blank which may be made by an inexpensive punching operation and shall embody a rim portion formed from, and integral with, the metal web.

Heretofore, gears made of fibrous material and a binder have been molded directly on a bushing. Such a construction is satisfactory in machine elements where the power transmitted is small and the bushing is not subjected to a torque sufficient to destroy the bond between the bushing and the molded material. Where a larger bonding surface for the molded material has been required, a metal center has been provided. The flange, web and hub were cast in one piece and the non-metallic working portion is molded on the flange. This construction was desirable wherever strength and exactness were required. In certain service conditions, a large bonding surface is desirable between the molded material and the metal center and it is also desirable to provide an inexpensive and easily constructed metal center which is light in weight.

My invention provides such a combination by making use of a single metal plate that may be punched or bent, in order to provide a flange on which the molded rim is anchored.

In the drawing constituting a part hereof and in which like characters designate like parts, Fig. 1 is a cross-sectional view of a gear wheel, Fig. 2 is a plan view of the metal web or center portion of the wheel showing the manner of punching and forming of the rim or flange thereof, and Fig. 3 is an elevational view of the metal web, showing a portion of the rim formed thereon.

The gear wheel comprises a central hub or bushing 1 attached to a metal web 2 by pressing it into a flanged and knurled central portion 3 of the web and if desired, securing it with rivets 4. Flanges 5 are formed in the web 2 and a composite working portion 6 of fibrous material impregnated with a binder, such as a phenolic condensation product, is molded thereon.

The flanges 5 are formed by cutting or punching radial or V-shaped slits 7 in the circular blank as shown in Fig. 2, thereby forming a series of tooth-like members and then bending the alternate teeth or sections 8 and 9 in opposite directions at right angles to the plane of the web. The faces of the flanges so formed present a peripheral band, as shown in Fig. 3, consisting of alternate spaces and flat metal portions in staggered relation. The flanges thus provide a face or support upon which the impregnated material is molded and a suitable roughened surface upon which to anchor the molded material.

A wheel formed in this manner from sheet metal combines light weight and great strength. The web and the flanged support for the molded material are formed without the use of rivets or bolts, and these parts will not become loosened in service. Ample means are provided for bonding the molded material to the metal.

Although I have described a specific embodiment of my invention, I do not wish to be limited thereto. For example, slits may be cut in the periphery of the metal disks in various ways, in order to form teeth of different shape thereon. The metal disk 2 may be distorted or upset to form a flange without previously slitting the material, or the face of the flanged portion may be formed by bending the metal at any angle to the surface of the disk which is greater or less than a right angle. The hub or sleeve member may be mounted in the center in any well known manner other than the one illustrated.

Other modifications will suggest themselves to those skilled in the art without departing from the spirit of my invention the scope of which is defined in the annexed claims.

I claim as my invention:

1. A gear blank comprising a working body of molded material, and a web member of punched metal having oppositely disposed distorted portions in the periphery thereof for providing a rim of alternate spaces and sections of metal.

2. A gear blank comprising a working body of molded material, and a web member of punched metal having oppositely disposed distorted portions in its periphery for providing a cylindrical rim of alternate spaces and sections of metal that is perpendicular to the plane of said web.

3. A gear blank comprising a working body of molded material, and a web member consisting of punched sheet metal, an upstruck portion in the center of said web member for mounting a hub therein and a spaced transversely distorted segments of metal on the rim portion of said web member.

4. A gear blank comprising a working body of molded material, a web member of punched sheet metal, a distorted portion in the center of said web member for mounting a hub therein and distorted portions on the rim portion of said web member, said distorted portions being arranged in a manner to provide a cylindrical rim perpendicular to the plane of said web of staggered sections of said metal.

5. A gear comprising a working body of molded material, a web member consisting of sheet metal having distorted portions in the rim portion, said distorted portions being arranged so as to provide spaced segments of metal extending at an angle from said web portion.

6. A gear comprising a working body of molded material, a web member of sheet metal having a rim portion composed of oppositely disposed segments of metal arranged in staggered relation and providing an anchoring means for said molded material.

7. A gear comprising a working surface of a molded material, a cast-metal hub and a web member of sheet metal having a distorted rim portion and a distorted central portion, the distorted rim portion of said web providing an anchoring means for said molded material and the central distorted portion providing an anchoring means for said hub.

8. A mechanical element comprising a flexible metal center portion having at its outer periphery elements transversely projecting from opposite sides thereof, and a non-metallic peripheral part mounted on the metallic center portion and having the said tongue embedded in its under side.

9. A mechanical element comprising a hub, a metal web projecting from the hub, a non-metallic peripheral part, and an interrupted flange projecting transversely from the outer edge and on each side of said web and supporting the peripheral part.

10. A mechanical element comprising a hub, a metal web projecting from the hub and having at its outer edge spaced tongues projecting transversely from both sides to form interrupted flanges, and a molded peripheral portion supported by said flanges and interlocked with said tongues.

In testimony whereof, I have hereunto subscribed my name this 20th day of March, 1924.

ARTHUR J. BASTIAN.